Feb. 19, 1974   P. W. O'BRIEN   3,793,423

METHOD OF MAKING CORRUGATED FLEXIBLE TUBING

Filed Nov. 6, 1968

INVENTOR
Patrick William O'Brien
BY Cushman, Darby & Cushman
ATTORNEYS

United States Patent Office 3,793,423
Patented Feb. 19, 1974

3,793,423
METHOD OF MAKING CORRUGATED FLEXIBLE TUBING
Patrick William O'Brien, Springhead, near Oldham, England, assignor to Compoflex Company Limited, near Oldham, Lancashire, England
Filed Nov. 6, 1968, Ser. No. 773,859
Claims priority, application Great Britain, Nov. 6, 1967, 50,382/67; Dec. 20, 1967, 57,933/67
Int. Cl. B29f 3/00
U.S. Cl. 264—103          17 Claims

ABSTRACT OF THE DISCLOSURE

Process for the manufacture of corrugated flexible tubing which is formed of plastic material extruded with annular corrugations disposed longitudinally thereof wherein the annular corrugations as compressed longitudinally after extrusion into a close pitched condition.

---

This invention relates to improvements in flexible tubing and is concerned with corrugated tubing constructed wholly or mainly of plastics material particularly, but not exclusively, for use as hose for vacuum cleaners.

There are many factors which have to be taken into account in the construction of vacuum cleaner hose which is one of the most highly stressed hoses having regard to its weight, possible methods of construction and acceptable price. The primary requirements for a vacuum hose are flexibility, an absence of resistance to turning when used and an ability to withstand the crushing effect of being stood upon or shut in a door, coupled with high resistance to collapse when looped and pulled with the force applied by the average housewife or other operator. It should also be of attractive appearance to find a ready sales market and be of the lightest weight possible consistent with the necessary strength, to facilitate the use of the cleaner and reduce fatigue to the operator. The hose must be airtight and durable in service under all conditions and resistant to abrasion. There must be an absence of noise or whistle in operation and finally the manufacturing cost must be such that it can be sold at a price which will enable it to compete in a highly competitive market.

The present invention seeks to meet the desiderata outlined above and provides a process for the manufacture of corrugated flexible tubing which is formed of plastics material extruded with annular corrugations disposed longitudinally thereof wherein the annular corrugations are compressed longitudinally after extrusion into a close pitched condition. The corrugations are closed up or nearly closed up either by a continuous process on a mandrel after extrusion or the extrusion and corrugation and the closure of the corrugations may be a continuous process. The effect of closing the corugations is to provide the hose with a substantially smooth internal bore which eliminates the tendency to whistling in operation above referred to. There is also a substantial improvement in airflow owing to the fact that the closing of the corrugations enables the hose to approximate to a smooth bore hose. Setting of the corrugations in compressed condition is advantageously facilitated by the application of heat which should be carefully controlled. The source of heat may be steam, hot air, fluids, electrical or electronic such as micro-wave high frequency dielectric or other suitable means.

In carrying out the process a light tubular mandrel is preferably attached to the extruder on to which the corrugated tubing is extruded and along which it is progressed and compressed by means of two devices frictionally engaging the tubing and operating at differential speeds. Advantageously, the tubing is passed successively through heating and cooling means located in spaced relation along the mandrel and disposed between the said devices. The said devices consist of caterpillar haul-offs each comprised of a pair of endless belts having padded surfaces disposed towards the mandrel which engage diametrically opposed surfaces of the tubing one of the said belts being driven clockwise and the other anti-clockwise, the device nearer the extruder being driven faster than that remote from the extruder and preferably at twice the speed thereof. The driven speed of the belts of the haul-off adjacent the extruder is advantageously slightly faster than the speed of extrusion.

While other plastics may be used in the construction of tubing in accordance with the invention but it is preferred to use polypropylene. While the thickness of the wall will vary with the size of the bore of the hose for a normal vacuum hose a thickness of between 12 and 18 thousandths of an inch is suitable and preferably 15 thousands of an inch.

The tube may be compressed to such an extent that it loses approximately one third to one half its length in the compression process but the compression ratio, i.e. the ratio between the length of the tube as extruded and its length after compression varies with the profile of the corrugations. Generally, a compression ratio of 1.62 to 1 has been found to be most acceptable. It has also been found desirable in the case of hose of 1¼" bore in accordance with the invention to compress to such an extent that the hose will bend up to a radium of 1" to 1¼". In the case of hose of 1½" bore the desirable bend radius is 1¼ to 1½" and in the case of hose of 1¾ bore, 1½ to 2". With this compression the hose retains its flexibility. There is also a definite resistance to further bending caused by the fact that, since the corrugations are contiguous when the hose is bent, on the outside of the curve of the hose the corrugations open to their limit and then cease to open further while the corrugations on the inside of the bend are already touching one another and resist further compression. This fact prevents early collapse of the hose. If sufficient force is applied to bend the hose further, and very considerable force is necessary for this to be done, the hose can be caused to collapse but it sustains no damage and returns to its normal condition when the force is released. It has been found that resistance to crushing of hose compressed in accordance with the invention is increased by a factor of about 10 over smooth hose and as mentioned above the undesirable whistling noise associated with ordinary corrugated hose is eliminated.

Advantageously, the compressed hose may be braided preferably with high density polyethene. If polythene tape is used a suitable width for the tape has been found to be seventy thousandths of an inch wide. Braiding protects the hose against abrasion and provides what is in effect a corset for the hose. It also further improves resistance to crushing. The braid does not interfere with the flexibility of the hose if applied at the correct tension and it prevents elongation of the hose and reinforces its resistance to bending after the desired bend radius has been reached. It also improves the appearance of the hose thereby rendering it more acceptable to the user.

As an alternative to, or in addition to the braiding above referred to, a plastic extruded cover may be applied to the hose. The plastic may be clear, opaque or suitably coloured. Instead of braiding with high density polythene, multistrand cotton may be used as braiding and tapes of other plastics may be used but high density polythene is in general preferred.

The invention also consists in apparatus for manufacturing flexible tubing comprising an extruder adapted to extrude tubing of plastics material having annular corrugations longitudinally thereof, a mandrel attached to said extruder, a pair of caterpillar belts provided with frictional gripping means disposed adjacent said extruder and at opposite ends of a diameter of the mandrel and a second pair of like caterpillar belts disposed in like manner in relation to the mandrel at a point thereof remote from the extruder.

In order that the invention may be clearly understood and readily carried into effect the same will now be described with reference to the accompanying drawings in which.

Figure 1:
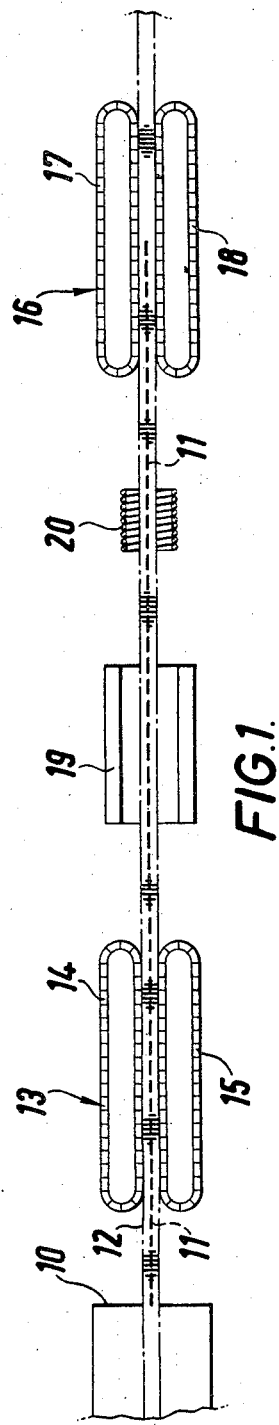
FIG. 1 shows schematically apparatus for carrying out the invention.

Referring to FIG. 1, 10 shows the end of the extruder. This may be of any form known for the production of corrugated flexible tubing. Secured to the mouth of the extruder and advantageously to a mandrel thereof is a light tubular mandrel 11 onto which the tubing 12 is extruded. Adjacent the mouth of the extruder is disposed a device generally indicated by the reference 13 and known as a caterpillar hauloff. This device consists of two driven caterpillar belts 14, 15, having gripping pads thereon. The belts are arranged diametrically opposite to one another at each side of the mandrel with the gripping pads inwards so that they engage the tubing on the mandrel. The belt 14 is driven anti-clockwise and the belt 15 clockwise to progress the tubing along the mandrel. In operation the mandrel 11 is passed into the tubing as it emerges from the extruder and before it reaches the device 13. The mandrel 11 is then secured to the mandrel of the extruder.

A second caterpillar haul-off generally indicated at 16 is disposed remotely from the extruder 10 and is provided with belts 17 and 18, similar to the belts 14 and 15. The belt 17 is driven anti-clockwise. The belts of the caterpillar haul-off 16 are driven at about one-half the speed of the belts of the caterpillar haul-off 13 so that the tubing is compressed between the devices 13 and 16 and the belts of the device 13 are driven fractionally faster than the speed of extrusion.

Disposed between the devices 13 and 16 are a heating means 19 and a cooling means 20. The heating means 19 is disposed nearer to the device 13 and the cooling means nearer the device 16. The heating means is shown as a heating oven but any suitable means may be employed. Similarly the cooling means shown as a cooling coil may be replaced by other suitable means. The tubing is softened in the heater to assist compression and is set in the cooling device.

Figure 2:
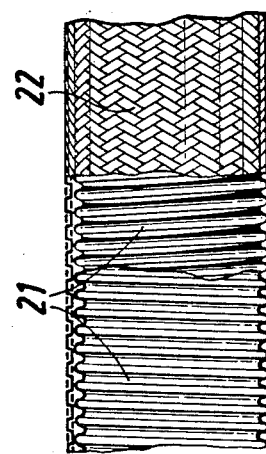
FIG. 2 is a longitudinal section of a piece of flexible tubing manufactured according to the invention.

FIG. 2 shows in longitudinal section a tube manufactured according to the process and with the aid of apparatus according to the invention. The compressed flexible corrugated tubing is shown at 21 and is provided with a covering 22 of high density polythene braiding.

Hose constructed in accordance with the invention is found to combine the properties desirable in a hose for vacuum cleaners and like purposes. It is exceptionally light and is free from noise or whistle in operation. It has great flexibility and has the property of resisting bending beyond its desirable bending radius. It has excellent resistance to crushing and recovers its form and shape after being subjected to excessive loading or crush. It also resists abrasion and is completely air-tight at the same time offering little resistance to airflow. There is very little resistance to turning in ordinary use and the hose can be manufactured at a competitive price.

I claim:

1. A process for the manufacture of corrugated flexible tubing comprising extruding the said tubing with annular corrugations disposed longitudinally therealong onto a mandrel, compressing the said tubing upon the mandrel by means of a pair of haul-offs each comprised of a pair of endless padded belts engaging diametrically opposed surfaces of the tubing, one of the said belts being driven clockwise and the other anti-clockwise, and driving the device nearer the extruder at a higher speed than that remote from the extruder to define therebetween a region of axially compressed tubing which is free from external mechanical contact, heating the tubing in the course of compression within said region and subsequently cooling the tubing in its compressed state within said region.

2. A process as claimed in claim 1 wherein the belts of the device adjacent the extruder are driven at substantially twice the speed of that of the belts remote from the extruder.

3. A process as claimed in claim 1 wherein the driven speed of the belts of the haul-off adjacent the extruder is slightly faster than the speed of extrusion.

4. A process as claimed in claim 1 wherein the tubing is first heated in a heating oven and then cooled by cooling means spaced along the mandrel between the said haul-off devices.

5. A continuous process for the manufacture of corrugated flexible tubing which is formed of plastics material comprising the steps of successively extruding said tubing, with annular corrugations disposed along the length thereof, compressing the said annular corrugations into close pitch condition by directing pressure axially against the travel of the tubing in such a manner as to create a region of axially compressed tubing which is free from external mechanical contact, heating the tubing to a temperature which causes said tubing to soften while the tubing is in the course of compression within said region whereby the compression is facilitated, and then cooling the tubing in its compressed state within said region to set the closed corrugations in close pitch relationship.

6. A process as claimed in claim 5 wherein the tubing is severed after extrusion and subsequently compressed.

7. A process as claimed in claim 5 wherein a mandrel is attached to the extruder onto which the corrugated tubing is extruded and along which it is progressed and compressed by means of two devices frictionally engaging the tubing and operating at differential speeds.

8. A process as claimed in claim 5 wherein the tubing is compressed so as to lose one-third to one-half of its length in the compression process.

9. A process as claimed in claim 5 wherein the tubing is compressed in the ratio of 1.62 to 1.

10. A process as claimed in claim 5 wherein the tubing is formed of polypropylene.

11. A process as claimed in claim 5 wherein the wall thickness of the plastics material is between 12 and 18 thousandths of an inch.

12. A process as claimed in claim 5 wherein the wall thickness is fifteen thousandths of an inch.

13. A process as claimed in claim 5 wherein other coatings are superposed on the said tubing.

14. A process as claimed in claim 5 wherein a layer of high density polythene braiding is superposed on said tubing.

15. A process as claimed in claim 5 wherein the bore of the tubing is 1¼ inches and the tubing is capable of being bent to a radius of 1 to 1¼ inches.

16. A process as claimed in claim 5 wherein the bore of the tubing is 1½ inches and the tubing is capable of being bent to a radius of 1¼ to 1½ inches.

17. A process as claimed in claim 5 wherein the bore of the tubing is 1¼ inches and the tubing is capable of being bent to a radius of 1½ to 2 inches.

References Cited
UNITED STATES PATENTS

| | | | |
|---|---|---|---|
| 2,712,157 | 7/1955 | Holte | 264—287 |
| 3,287,194 | 11/1966 | Waddell | 264—173 |
| 2,513,106 | 6/1950 | Prendergast | 264—173 |
| 3,264,383 | 8/1966 | Niessner | 264—209 |
| 2,866,230 | 12/1958 | Holte | 264—Dig. 52 |
| 3,248,463 | 4/1966 | Wiley et al. | 18—14 A X |

FOREIGN PATENTS

| | | | |
|---|---|---|---|
| 261,994 | 5/1964 | Netherlands | 18—19 TC |
| 621,676 | 6/1961 | Italy | 18—14 A |
| 1,038,433 | 8/1966 | Great Britain | 18—14 A |

ROBERT F. WHITE, Primary Examiner

W. E. HOAG, Assistant Examiner

U.S. Cl. X.R.

264—173